United States Patent
Chao et al.

(10) Patent No.: US 10,587,417 B2
(45) Date of Patent: Mar. 10, 2020

(54) DOCUMENT ENCRYPTION PROMPT METHOD AND SYSTEM

(71) Applicants: Beijing Kingsoft Office Software Co., Ltd., Beijing (CN); Zhuhai Kingsoft Office Software Co., Ltd., Jida Zhuhai (CN)

(72) Inventors: Yuntong Chao, Jida Zhuhai (CN); Dizuo Ou, Jida Zhuhai (CN); Zhishou Huang, Jida Zhuhai (CN); Xupeng Huang, Jida Zhuhai (CN); Xuewen Hong, Jida Zhuhai (CN); Huan Liu, Jida Zhuhai (CN); Yafei Li, Jida Zhuhai (CN); Ting Fang, Jida Zhuhai (CN)

(73) Assignee: Beijing Kingsoft Office Software, Inc.

( * ) Notice: Subject to any disclaimer, the term of this patent is extended or adjusted under 35 U.S.C. 154(b) by 190 days.

(21) Appl. No.: 15/108,180

(22) PCT Filed: Nov. 25, 2014

(86) PCT No.: PCT/CN2014/092196
§ 371 (c)(1),
(2) Date: Jun. 24, 2016

(87) PCT Pub. No.: WO2015/096578
PCT Pub. Date: Jul. 2, 2015

(65) Prior Publication Data
US 2016/0344556 A1    Nov. 24, 2016

(30) Foreign Application Priority Data
Dec. 27, 2013  (CN) .......................... 2013 1 0740997

(51) Int. Cl.
*G06F 21/60*   (2013.01)
*H04L 9/32*    (2006.01)
(Continued)

(52) U.S. Cl.
CPC .......... *H04L 9/3247* (2013.01); *G06F 3/0482* (2013.01); *G06F 21/60* (2013.01); *H04L 63/0428* (2013.01); *H04L 67/06* (2013.01)

(58) Field of Classification Search
CPC ...... G06F 21/60; G06F 21/62; G06F 21/6209; G06F 21/6218; G06F 21/6245
See application file for complete search history.

(56) References Cited

U.S. PATENT DOCUMENTS 5,970,451 A * 10/1999 Lewis .................... G10L 15/22
                                                    704/235
8,737,614 B1 * 5/2014 Mulligan ............. H04L 9/3073
                                                    380/243
(Continued)

FOREIGN PATENT DOCUMENTS

CN    101071462 A    11/2007
CN    101510878 A     8/2009
(Continued)

OTHER PUBLICATIONS

Niton, Microsoft Community, Can you invoke Spell Check automatically when you close or save a file in Excel 2010, https://answers.microsoft.com/en-us/msoffice/forum/all/can-you-invoke-spell-check-automatically-when-you/475737e6-6716-4f02-b4df-1899bd7d381f (Year: 2013).*
(Continued)

*Primary Examiner* — Khang Do
(74) *Attorney, Agent, or Firm* — Wolf, Greenfield & Sacks, P.C.

(57) ABSTRACT

Disclosed are a document encryption prompt method and system. The document encryption prompt method comprises: detecting text content of a target document, and if the text content of the target document comprises a preset sensitive word, determining that the document is a sensitive document; and prompting a user to encrypt the sensitive (Continued)

document. A document encryption prompt system comprises: a detecting unit and a prompting unit. The detecting unit is configured to detect text content of a target document, and if the text content of the target document comprises a preset sensitive word, determine that the document is a sensitive document; and the prompting unit is configured to prompt the user to encrypt the sensitive document. According to this application, a user does not need to manually determine whether to encrypt a document, and the user can be prompted in time to perform encryption processing on the document, thereby improving the security of the document.

7 Claims, 2 Drawing Sheets

(51) Int. Cl.
*H04L 29/08* (2006.01)
*H04L 29/06* (2006.01)
*G06F 3/0482* (2013.01)

(56) References Cited

U.S. PATENT DOCUMENTS

| | | | | |
|---|---|---|---|---|
| 2002/0124177 | A1* | 9/2002 | Harper | G06F 21/6245 713/189 |
| 2004/0078577 | A1* | 4/2004 | Feng | G06F 21/10 713/182 |
| 2005/0235163 | A1* | 10/2005 | Forlenza | H04L 9/088 713/193 |
| 2005/0262557 | A1* | 11/2005 | Fellenstein | H04L 63/0428 726/22 |
| 2006/0075228 | A1* | 4/2006 | Black | H04L 63/0428 713/167 |
| 2011/0273281 | A1* | 11/2011 | Adams | G06Q 10/109 340/309.16 |
| 2012/0159142 | A1* | 6/2012 | Jibbe | G06F 8/65 713/100 |
| 2013/0060863 | A1* | 3/2013 | D'Eri | G06F 17/274 709/206 |
| 2014/0208418 | A1* | 7/2014 | Libin | G06F 21/6209 726/19 |
| 2015/0178061 | A1* | 6/2015 | Wang | G06F 8/61 717/172 |

FOREIGN PATENT DOCUMENTS

| | | |
|---|---|---|
| CN | 102340424 A | 2/2012 |
| CN | 102984128 A | 3/2013 |
| CN | 103139296 A | 6/2013 |
| CN | 103442061 A | 12/2013 |
| JP | 2001-505688 A | 4/2001 |
| JP | 2002-055961 A | 2/2002 |
| JP | 2008-033697 A | 2/2008 |
| JP | 2011-221894 A | 11/2011 |

OTHER PUBLICATIONS

International Search Report and Written Opinion for Application No. PCT/CN2014/092196 dated Feb. 27, 2015.

* cited by examiner

DOCUMENT ENCRYPTION PROMPT METHOD AND SYSTEM

CROSS REFERENCE TO RELATED APPLICATIONS

The present application is the National Phase under 35 U.S.C. § 371 of PCT International Application No. PCT/CN2014/092196, filed Nov. 25, 2014, which claims the priority of a Chinese patent application No. 201310740997.X entitled "Document encryption prompting method and document encryption prompting system" filed before China Patent Office on Dec. 27, 2013, the entire contents of which are hereby incorporated in the present application by reference in their entirety.

Technical Field

The present application relates generally to technical field of computer application, and more particularly, to a method and system for document encryption prompt.

Background Art

With the development of computer technology, paperless office has become a main trend. The appearance of various office software provides great convenience for people's study and work. Nowadays, a majority of materials are stored in the form of document in a computer. Compared to paper documents, electronic documents are easy to carry, and prone to be modified, thus having been widely used.

A large quantity of information is stored in documents by both collective and individual. Many of the documents involve sensitive information, such as trade secret, individual privacy and the like. It has become a particularly important problem as how to ensure the security of this information.

Document encryption is a common method among various methods for enhancing information security. For now, encrypting a document in a computer is carried out manually by a user. The user needs to determine whether the document needs to be encrypted, which is inconvenient in the practical application. Furthermore, the user sometimes forgets to encrypt the document, which is adverse to its security.

SUMMARY OF THE INVENTION

In order to solve the above questions, the present application provides a method and system for document encryption prompt to enhance the security of a document. The technical solution is as follows:

a method for document encryption prompt, which comprises:

detecting text content of a target document, and if the text content of the target document contains a preset sensitive word, determining that the document is a sensitive document;

prompting a user to encrypt the sensitive document.

The detecting of the text content of a target document comprises:

after loading of the content of the document for the first time is completed, detecting the text content of the target document;

or when the document is being edited, after receiving a preset operation instruction, detecting the text content of the target document.

The preset operation instruction is an operation instruction executed manually by a user, or an operation instruction executed automatically.

Preferably, prompting a user to encrypt the sensitive document is to provide the user with encryption operation options;

the encryption operation options include: an encryption confirming option and an encryption canceling option.

The encryption operation options further include option for temporarily not performing encryption;

the method further comprises: if a selection operation of the option for temporarily not performing encryption by the user is received, then prompting the user again to encrypt the sensitive document when the document is closed by the user.

The encryption operation options further include an option for not encrypting now;

The method further comprises: if a selection operation of the option for temporarily not performing encryption by the user is received, then prompting the user again to encrypt the sensitive document when the preset operation instruction is received again.

The embodiment of the present also application provides a document encryption prompt system, which comprises: a detection unit and a prompt unit;

the detection unit is used for detecting text content of a target document, and if the text content of the target document contains a preset sensitive word, then determining that the document is a sensitive document;

the prompt unit is used for prompting a user to encrypt the sensitive document.

The detection unit detecting the text content of a target document specifically comprises:

after loading of the content of the document for the first time is completed, the detection unit detecting the text content of the target document;

or when the document is being edited, after receiving a preset operation instruction, the detection unit detecting the text content of the target document.

The preset operation instruction is an operation instruction executed manually by a user, or an operation instruction executed automatically.

Preferably, the prompt unit is specifically used for providing the user with encryption operation options;

the encryption operation options include: an encryption confirming option and an encryption canceling option.

The encryption operation options provided by the prompt unit further include: an option for temporarily not performing encryption;

the prompt unit is further used for: if a selection operation of the option for temporarily not performing encryption by the user is received, then prompting the user again to encrypt the sensitive document when the document is closed by the user.

The encryption operation options provided by the prompt unit further include: an option for temporarily not performing encryption;

The prompt unit is further used for if a selection operation of the option for temporarily not performing encryption by the user is received, then prompting the user again to encrypt the sensitive document when the preset operation instruction is received at the next time.

Embodiments of the present application also provide a storage medium, wherein, the storage medium is used for storing application programs, the application programs are used for carrying out the method for document encryption prompt of the present application when executed.

Embodiments of the present application provide an application program, which is used to execute the document encryption prompt method of the present application when in operation.

In the technical solution of the embodiment of the present application, firstly, detect the text content of a document, if the text content of the document contains a preset sensitive word, then prompt a user to encrypt the document. A user does not need to determine whether a document needs to be encrypt, which is convenient for the user. In addition, by prompting a user to encrypt a document, the document will be handled by the user timely, which enhances the security of the document.

BRIEF DESCRIPTION OF THE DRAWINGS

In order to describe embodiments of the present application or technical solutions in prior art more clearly, drawings used for describing the embodiments of the present application or the prior art will be described briefly below. It is obvious that the drawings for the following description are only for some embodiments of the present application, and other drawings can also be obtained by those skilled in the art based on these drawings without any creative effort.

DETAILED DESCRIPTION

Firstly, a method for document encryption prompt provided by an embodiment of the present application is described, the method comprises:

detecting text content of a target document, and if the text content of the target document contains a preset sensitive word, determining that the document is a sensitive document;

prompting a user to encrypt the sensitive document.

In the technical solution of the embodiment of the present application, firstly, text content of a document is detect, and if the text content of the document contains a preset sensitive word, then a user is prompted to encrypt the document. A user does not need to determine whether a document needs to be encrypt, which is convenient for the user. In addition, by prompting a user to encrypt a document, the document will be handled by the user timely, which enhances the security of the document.

The technical solutions of the embodiments of the present application will be described clearly and completely in combination with the drawings for the embodiments of the present application. The embodiments described here are only a part of the embodiments of the present application, rather than all of them. Other embodiments obtained by an ordinary skilled in the art without any creative effort based on the embodiments of the present application should fall into the protection scope of the present application.

Figure 1:
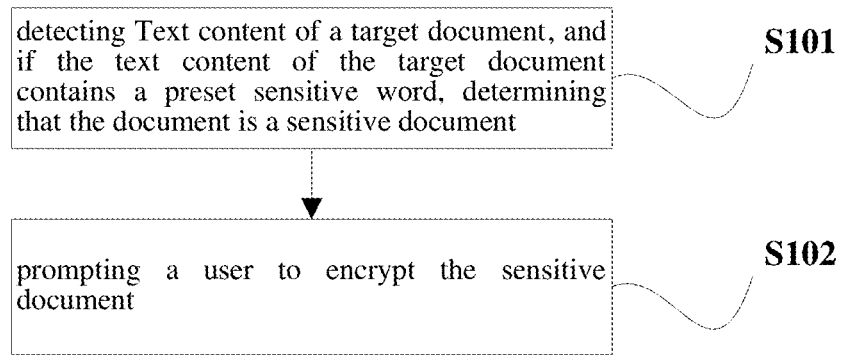
FIG. 1 is a first flowchart of a method for document encryption prompt provided by an embodiment of the present application.

FIG. 1 is a first flowchart of a method for document encryption prompt provided by an embodiment of the present application. The method for document encryption prompt provided by an embodiment of the present application is intended for an electronic document. In practice, an electronic document refers to a file containing text information therein, for example a file generated by a program such as a word processing program, a presentation program and the like. The method provided by an embodiment of the present application is illustrated here for a document generated by a word processing program. It should be noted that the word processing program herein is merely for illustration, to which the present application is not limited. Further, the document generated by a word processing program herein can be a newly created document, or an existing document.

By an example of a document generated by a word processing program, the method for document encryption prompt provided by an embodiment of the present application will be described. The method comprises the following steps.

In S101, text content of a target document is detected, and if the text content of the target document contains a preset sensitive word, then it is determined that the document is a sensitive document.

encrypting of a document by a user is mainly to protect the information contained in the document. However, a great number of documents are stored in a computer by both collective and individual; some of these documents do not require encryption. Therefore, there is a need to distinguish from all the documents which documents need to be encrypted. In the embodiment of the present application, which documents need to be encrypted are determined by detecting the text content thereof.

In the embodiment of the present application, the text content of a target document can be detected after this document is loaded, or when this document is being edited.

The detecting of a target document when it is being edited is carried out after a preset operation is received. The preset operation can be performed by a user actively, or automatically. It should be noted that the preset operation can be a built-in operation in a program such as a word managing program, to which the present application is not limited.

For example, in the case that the preset operation is "SAVE", when the user opens a document generated by the word managing program and performs editing, and if the user performs the "SAVE" operation, the text content of the document is detected after this operation has been performed. Generally, the word processing program has an auto-save function. In this case, the detecting of the text content of a document is initiated each time when the save function is performed.

The purpose of detecting the text content of a target document is to determine whether the text content of the target document contains a preset sensitive word, and if so, it is determined that the target document is a sensitive document.

A criterion is needed to determine whether a document needs to be encrypted. In the embodiment of the present application, this criterion is based on whether the target document contains a sensitive word. The sensitive word mentioned here can be a preset sensitive word, or a sensitive word set by the user as needed and can be modified anytime.

It should be understood that more than one sensitive word can be preset, and a sensitive word library can be set in which several sensitive words is contained. As long as the text content of the target document contains one sensitive word in the sensitive word library, it can be determined that the target document is a sensitive document. It not only further ensures the security of information, but also enables a user to modify the content of the sensitive word library as needed, which is convenient for the user.

In S102, a user is prompted to encrypt the sensitive document.

After it is determined that the target document is a sensitive document, it is possible to prompt the user to encrypt the sensitive document by a pop-up dialog box.

It should be noted that the interaction between a user and a dialog box provided by the embodiment of the present application is a preferable manner, to which the present application is not limited. Other interaction manners can be used to prompt the user to determine whether the target document needs to be encrypted.

By means of the above method, it is not needed for a user to determine manually which documents need to be encrypted, which simplifies user's operation, and the user can be timely prompted to encrypt the documents which need to be encrypted, therefore the security of the document is enhanced.

Figure 2:
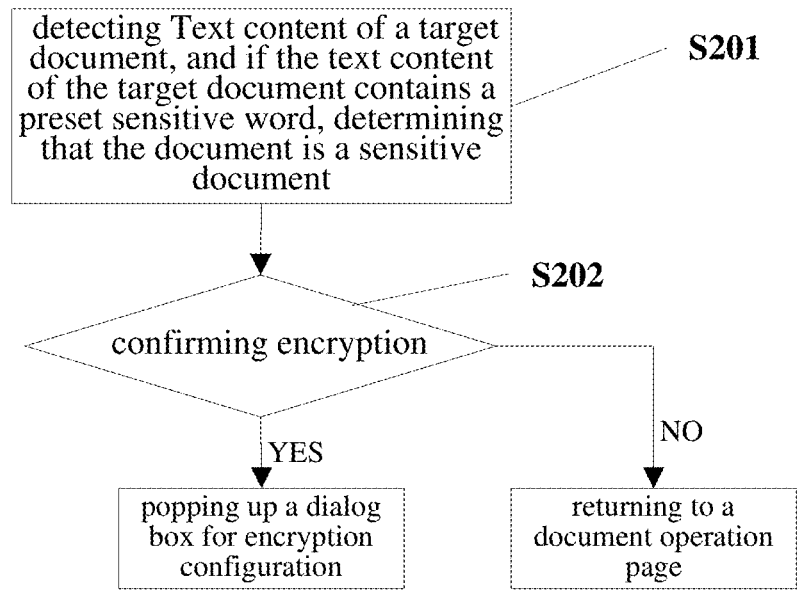
FIG. 2 is a second flowchart of a method for document encryption prompt provided by an embodiment of the present application.

In practice, a user needs to selectively encrypt target documents containing sensitive words. In this case, a second flowchart of the method for encryption prompt is provided by an embodiment of the present application, as shown in FIG. 2, which comprises the following steps.

In S201, text content of a target document is detected, and if the text content of the target document contains a preset sensitive word, then it is determined that this document is a sensitive document.

This step is essentially same with S101, and a detailed description is thus omitted.

Figure 3:
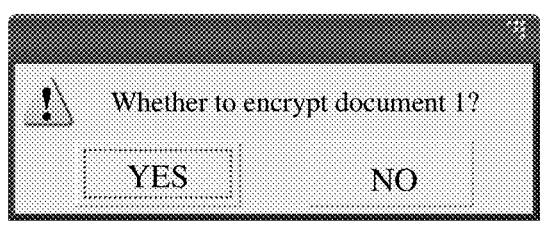
FIG. 3 is a schematic view of a first dialog box of encryption operation options provided by an embodiment of the present application.

S202, the user is provided with encryption operation options;

The encryption operation options described above are: an option that a user confirms encryption and an option that a user cancels encryption, respectively. Specifically, two options can be configured in a pop-up dialog box for conforming encryption, which are "YES" and "NO" respectively, as shown in FIG. 3.

If the user chooses "YES", then a new dialog box is popped up to enable the user to perform encryption configuration. The encryption configuration can be setting of a password for the target document, or can be other ways of encryption, to which the present application is not limited.

If the user chooses "NO", then return to a document editing page, which enables the user to continue to operate the document.

Figure 4:
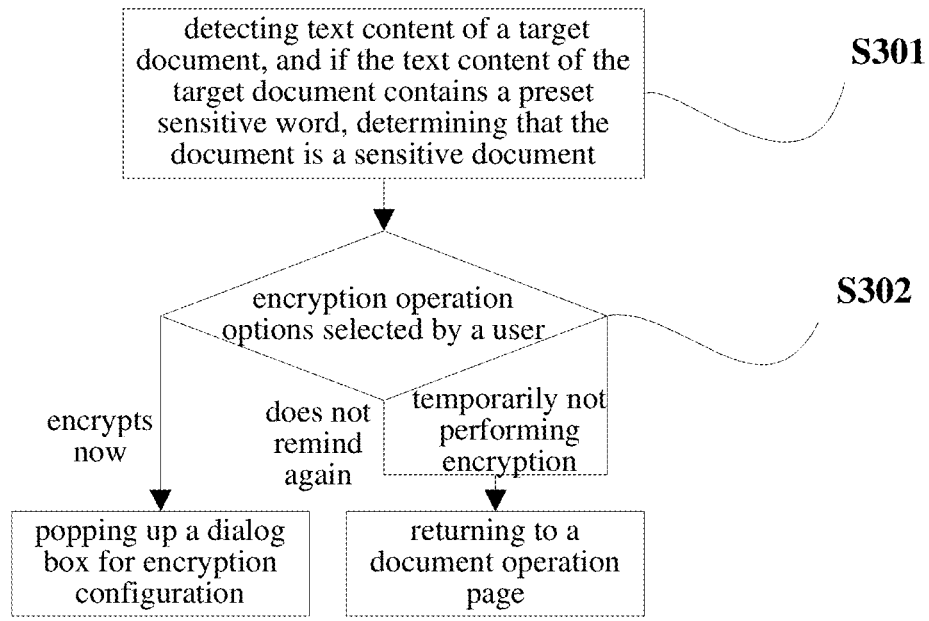
FIG. 4 is a third flowchart of a method for document encryption prompt provided by an embodiment of the present application.

In actual applications, the user sometimes is not sure at first whether the document is being edited needs to be encrypted. In this case, a third flowchart of the method for encryption prompt is provided by an embodiment of the present application, as shown in FIG. 4, which comprises the following steps.

In S301, text content of a target document is detected, and if the text content of the target document contains a preset sensitive word, then the document is determined a sensitive document.

This step is essentially same with S101, and a detailed description is thus omitted.

In S302, the user is provided with encryption operation options;

The encryption operation options described above are: an option that a user confirms encryption, an option for not encrypting now and an option that a user cancels encryption, respectively.

Figure 5:
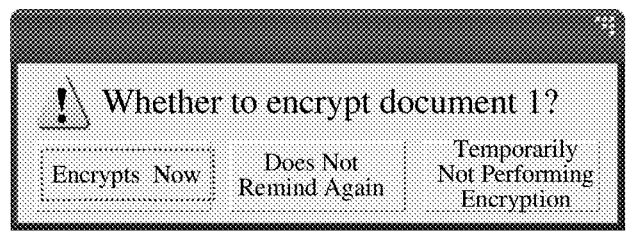
FIG. 5 is a schematic view of a second dialog box of encryption operation options provided by an embodiment of the present application.

Specifically, the options can be configured as: "ENCRYPTS NOW", "TEMPORARILY NOT PERFORMING ENCRYPTION" and "DOES NOT REMIND AGAIN", as shown in FIG. 5.

If the user chooses "ENCRYPTS NOW", then a dialog box is popped up to enable the user to perform encryption configuration. The encryption configuration can be setting password for the target document, or can be other ways of encryption, to which the present application is not limited.

If the user chooses "TEMPORARILY NOT PERFORMING ENCRYPTION", then return to a document editing page. When the preset operation is performed again, or the document is being closed, the user is prompted to encrypt the target document again. For example, when the user performs save operation again, or the word processing program performs automatically a save function, the user is prompted to encrypt the target document again.

If the user chooses "DO NOT REMIND AGAIN", then return to the document editing page and the user will not be prompted to encrypt the target document again.

By the above preferred method, the user can process the target document as needed, thus enhancing the security of the document even further.

Figure 6:
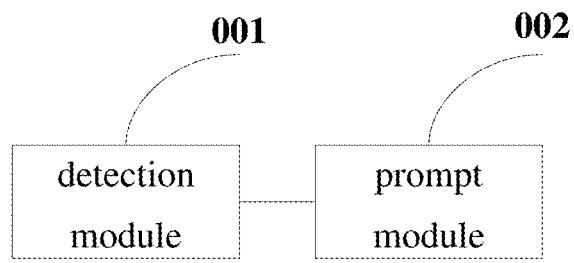
FIG. 6 is a schematic structural view of a system for document encryption prompt provided by an embodiment of the present application.

The embodiment of the present application also provides a system for document encryption prompt, as shown in FIG. 6. The system comprises: a detection unit 001 and a prompt unit 002;

The detection unit 001 is used for detecting text content of a target document, and if the text content of the target document contains a preset sensitive word, then determining this document as a sensitive document.

Specifically, the detection unit detecting the text content of a target document comprises:

after loading of the content of the document for the first time is completed, that is to say, after the document is opened, detecting the text content of the target document;

or, when the document is being edited, after receiving a preset operation instruction, detecting the text content of the target document. The preset operation instruction is an operation instruction executed manually by a user, or an operation instruction executed automatically. The operation instructions are built-in operation instructions in the word editing program. The specific content of the preset operation instructions are not limited by the present application.

If it is detected that the text content of the target document contains a preset sensitive word, then it is determined that the target document is a sensitive document, wherein, the preset sensitive word can be a preset sensitive word or a sensitive word set by the user.

The prompt unit 002 is used for prompting a user to encrypt the sensitive document.

Specifically, the prompt unit can provide the user with encryption operation options, which may include: an encryption confirming option and an encryption canceling option.

If the user chooses to confirm encryption, then prompt the user to perform encryption configuration. The encryption configuration can be setting of a password for the target document, or can be other ways of encryption, to which the present application is not limited.

If the user chooses to cancel encryption, then return to the document editing page.

Furthermore, the encryption operation options can further include: an option for temporarily not performing encryption;

If a selection operation of the option for temporarily not performing encryption by the user is received, then prompting the user again to encrypt the sensitive document when the document is closed by the user, or when the preset operation instruction is received again.

The document encryption prompt system described above, firstly, detects the text content of a document, if the text content of the document contains a preset sensitive word, then prompts a user to encrypt this document. The user does not need to determine whether a document needs to be encrypted, which is convenient for the user. In addition, by prompting a user to encrypt a document, the document will be handled by the user timely, which enhances the security of the document. Furthermore, the user is provided with encryption operation options, which enables the user to process the document as needed; therefore, the security of the document is enhanced even further.

The embodiments of the system are briefly described and reference can be made to the description of the embodiments of the method for its related contents since the embodiments of the device are substantially similar to those of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which comprise the listed elements.

It can be understood by a person skilled in the art that all or a part of steps in the implementations of the above method can be carried out by related hardware being instructed by programs, which can be stored in computer readable storage medium, such as ROM/RAM, disk and optical disk etc.

Embodiments of the present application also provide a storage medium, wherein the storage medium is used for storing application programs, the application programs are used for carrying out the document encryption prompt method of the present application when executed.

Embodiments of the present application provide an application program, which is used to execute the document encryption prompt method of the present application when in operation.

The embodiments described above are just preferable embodiments of the present application, and not indented to limit the protection scope of the present application. Any modifications, alternatives, improvements or the like within the spirit and principle of the present application are all comprised in the protection scope of the present application.

What is claimed is:

1. A method for document encryption prompt, characterized in that, the method comprises:
presetting a sensitive word library comprising several sensitive words;
detecting text content of a target document, and if the text content of the target document contains a preset sensitive word in the sensitive word library, determining that the document is a sensitive document; and
prompting a user to encrypt the sensitive document;
wherein detecting text content of a target document comprises:
when the document is being edited, after receiving a preset operation instruction, detecting the text content of the target document;
wherein prompting a user to encrypt the sensitive document is to provide the user with encryption operation options; the encryption operation options include: an encryption confirming option, an option for temporarily not performing encryption and an encryption canceling option;
if the user chooses the encryption confirming option, a dialog box is popped up to enable the user to perform encryption configuration;
if the user chooses the option for temporarily not performing encryption, it is returned to a document editing page and the user is prompted again to encrypt the one and the same sensitive document when the preset operation instruction is received at the next time; and
if the user chooses the encryption canceling option, it is returned to the document editing page and the user is not prompted to encrypt the target document again.

2. The method according to claim 1, characterized in that, the preset operation instruction is an operation instruction executed manually by a user, or an operation instruction executed automatically.

3. The method according to claim 1, characterized in that, the encryption operation options further include an option for temporarily not performing encryption;
the method further comprises: if a selection operation of the option for temporarily not performing encryption by the user is received, then prompting the user again to encrypt the sensitive document when the document is closed by the user.

4. A non-transitory storage medium, characterized in that, it is used for storing an application program, the application program being used for carrying out the method for document encryption prompt according to claim 1 when executed.

5. A system comprising a processor and a memory, wherein a detection unit and a prompt unit are stored in the memory, which are executable by the processor for document encryption prompt; wherein,
the detection unit is executed to detect text content of a target document, and if the text content of the target document contains a preset sensitive word in a preset sensitive word library, determining that the document is a sensitive document;
the prompt unit is executed to prompt a user to encrypt the sensitive document;
wherein the detection unit detecting text content of a target document specifically comprises:
when the document is being edited, after receiving a preset operation instruction, the detection unit detecting the text content of the target document;
wherein the prompt unit is specifically executed to provide the user with encryption operation options; the encryption operation options include: an encryption confirming option, an option for temporarily not performing encryption and an encryption canceling option;
the prompt unit is further executed to:

if the user chooses the encryption confirming option, pop up a dialog box to enable the user to perform encryption configuration;

if the user chooses the option for temporarily not performing encryption, return to a document editing page and prompt the user again to encrypt the one and the same sensitive document when the preset operation instruction is received at the next time; and if the user chooses the encryption canceling option, return to the document editing page and the user is not prompted to encrypt the target document again.

6. The system according to claim 5, characterized in that, the preset operation instruction is an operation instruction executed manually by a user, or an operation instruction executed automatically.

7. The system according to claim 5, characterized in that, the encryption operation options provided by the prompt unit further include an option for temporarily not performing encryption;

the prompt unit is further executed to: if a selection operation of the option for temporarily not performing encryption by the user is received, then prompt the user again to encrypt the sensitive document when the document is closed by the user.

* * * * *

UNITED STATES PATENT AND TRADEMARK OFFICE
CERTIFICATE OF CORRECTION

PATENT NO. : 10,587,417 B2
APPLICATION NO. : 15/108180
DATED : March 10, 2020
INVENTOR(S) : Yuntong Chao et al.

Page 1 of 1

It is certified that error appears in the above-identified patent and that said Letters Patent is hereby corrected as shown below:

On the Title Page

Amend the Assignee in item (73), as follows:
(73) Assignee: Beijing Kingsoft Office Software, Inc. Beijing (CN)
Zhuhai Kingsoft Office Software Co., Ltd. Jida Shuhai (CN)

Signed and Sealed this
Eleventh Day of August, 2020

Andrei Iancu
*Director of the United States Patent and Trademark Office*